US006915977B2

(12) United States Patent
Hanzlik et al.

(10) Patent No.: US 6,915,977 B2
(45) Date of Patent: Jul. 12, 2005

(54) DATA STORAGE TAPE CARTRIDGE WITH STATIC DISSIPATIVE HOUSING

(75) Inventors: Jason D. Hanzlik, Wahpeton, ND (US); Gregory A. Laska, Woodbury, MN (US); Craig D. Lingwall, Wahpeton, ND (US)

(73) Assignee: Imation Corp., Oakdale, MN (US)

( * ) Notice: Subject to any disclaimer, the term of this patent is extended or adjusted under 35 U.S.C. 154(b) by 38 days.

(21) Appl. No.: 10/609,992

(22) Filed: Jun. 30, 2003

(65) Prior Publication Data

US 2004/0262438 A1 Dec. 30, 2004

(51) Int. Cl.[7] .............................................. G11B 23/107
(52) U.S. Cl. ....................................... 242/348; 360/132
(58) Field of Search ................................ 242/347, 348, 242/348.2; 360/132

(56) References Cited

U.S. PATENT DOCUMENTS

| | | | |
|---|---|---|---|
| 4,326,659 A | 4/1982 | Sato | |
| 4,533,969 A | 8/1985 | Miyashita et al. | |
| 4,607,808 A | 8/1986 | Collins | |
| 4,620,255 A | 10/1986 | Cook et al. | |
| 4,769,730 A * | 9/1988 | Okamura et al. | 360/132 |
| 5,714,936 A * | 2/1998 | Regelsberger | 242/348 |
| 5,786,967 A * | 7/1998 | Gerfast et al. | 360/132 |
| 6,212,036 B1 | 4/2001 | Todd et al. | |
| 6,302,344 B1 * | 10/2001 | Su | 360/132 |
| 6,390,402 B2 * | 5/2002 | Krula et al. | |
| 6,459,544 B1 | 10/2002 | Harper | |

FOREIGN PATENT DOCUMENTS

| | | |
|---|---|---|
| JP | 2002197746 | 7/2002 |
| JP | 2003223774 | 8/2003 |
| WO | 91/13017 | 9/1991 |

OTHER PUBLICATIONS

"What's in a name?" IDP Technology—Key Features, IDP website http://idptech.com/features.htm; pp. 1–3.
"DP Technology: The Challenge of Static Electricity," James R. Skinner, IDP website http:/idptech.com/static.htm; pp. 1–5.
"Electrostatic Properties of Materials," Fed. Test Method Std. No. 101c, Method 4046.1, pp. 1–4, Oct. 8, 1982.
"Health Care Facilities" brochure, National Fire Protection Association, 1990 Edition, ANSI/NFPA 99, pp. 99–106 through 99–108, Feb. 5, 1990.
"Tape Substation Migration," Data Cartridge Specification, Imation Corp. 1995–2000, 1 page.
"Barrier Materials, Flexible, Electrostatic Protective, Heat–Sealable" Performance Specification, MIL–PRF–81705D, Naval Air Warfare Center Aircraft Division, p. 1, 7, and 13, Sep. 3, 1998.
"Inherently Conducting Polymer Compounds" brochure from RTP Co.; pp. 1–2, Jul. 2000.
"PERMASTAT® Compounds" brochure from RTP Co., pp. 1–2, Dec. 2000.
"STAT: A guide to LNP's line of thermoplastic composites for electrostatic dissipation" brochure from LNP Engineering Plastics Inc., Bulletin #223–5.01–2.5, pp. 1–12, 2001.

* cited by examiner

*Primary Examiner*—William A. Rivera
(74) *Attorney, Agent, or Firm*—Eric D. Levinson

(57) ABSTRACT

A data storage tape cartridge includes a housing having a surface resistivity in a range of approximately $10^6$ ohms/square to approximately $10^{12}$ ohms/square, at least one tape reel rotatably disposed within the housing, and a length of magnetic storage tape wound around the at least one tape reel.

38 Claims, 4 Drawing Sheets

100
110
112
114
116
118

| Data Storage Tape Cartridge | Housing Material | Static Decay (sec) | Surface Resistivity (ohms/square) |
|---|---|---|---|
| C1 | polycarbonate | ∞ | $>10^{12}$ |
| C2 | glass-filled polycarbonate | ∞ | $>10^{12}$ |
| EX3 | polycarbonate/nylon/dissipative polymer | <0.01 | $10^{10}$ |
| EX4 | carbon-filled resin | <0.01 | $10^{9}$ |

*Fig. 4*

DATA STORAGE TAPE CARTRIDGE WITH STATIC DISSIPATIVE HOUSING

THE FIELD OF THE INVENTION

The present invention relates generally to data storage tape cartridges, and, more particularly, to a static dissipative housing for a data storage tape cartridge.

BACKGROUND OF THE INVENTION

Data storage tape cartridges are commonly used for storage and distribution of information for subsequent retrieval and use. Data storage tape cartridges generally include a housing, a tape reel rotatably disposed within the housing, and a length of magnetic storage tape wound around the tape reel. As such, data may be read from or written to the magnetic storage tape by a magnetic read/write head of a tape drive system. Data storage tape cartridges may include a dual tape reel configuration where interaction between the magnetic storage tape and the read/write head takes place within or very near the housing, or a single tape reel configuration where interaction between the magnetic storage tape and the read/write head takes place away from the housing.

During handling and/or use of a data storage tape cartridge, static electricity may build up as a static charge within the cartridge. As such, the static charge of the cartridge may damage data on the magnetic storage tape and/or attract debris such as dust or other particles to the cartridge including the magnetic storage tape. In addition, when the data storage tape cartridge is moved into and/or out of a tape drive system, the static charge may be imparted to the tape drive, thereby possibly damaging the tape drive.

Existing cartridges have included housings formed of insulative materials which, unfortunately, retain static charges and conductive materials which discharge static charges, often at an extremely high voltage which itself may be damaging to the cartridge or the tape drive system. For example, one type of data storage tape cartridge such as a 3570-type tape cartridge produced by Imation Corp. of Oakdale, Minn. includes a housing formed of a material which is conductive, such as a carbon-filled resin. During molding, however, conductivity of the material is affected, thereby resulting in a varying surface resistivity throughout different areas of the housing.

One direction of advancement in data storage tape cartridges includes increasing storage capacity of the cartridge. Storage capacity may be increased, for example, by increasing tape length within the cartridge. As tape length increases, however, the potential for static build-up also increases since the total surface area of tape within the cartridge increases. Another direction of advancement in data storage tape cartridges includes increasing recording density of the magnetic storage tape. Recording density may be increased, for example, by reducing magnetic particle size and increasing magnetic saturation levels of the magnetic storage tape. With increased recording density, however, the magnetic storage tape is more susceptible to potential damage from a static charge.

Accordingly, it is desirable for a data storage tape cartridge which dissipates static charge in the cartridge.

SUMMARY OF THE INVENTION

One aspect of the present invention provides a data storage tape cartridge including a housing having a surface resistivity in a range of approximately $10^6$ ohms/square to approximately $10^{12}$ ohms/square, at least one tape reel rotatably disposed within the housing, and a length of magnetic storage tape wound around the at least one tape reel.

Another aspect of the present invention provides a data storage tape cartridge including a housing, at least one tape reel rotatably disposed within the housing, a length of magnetic storage tape wound around the at least one tape reel, and means for dissipating a static charge in the data storage tape cartridge of approximately 5000 volts DC to approximately 500 volts DC in less than approximately 0.5 seconds.

Another aspect of the present invention provides a method of forming a data storage tape cartridge including forming a housing with a surface resistivity in a range of approximately $10^6$ ohms/square to approximately $10^{12}$ ohms/square, winding a length of magnetic storage tape around at least one tape reel, and rotatably disposing the at least one tape reel within the housing.

BRIEF DESCRIPTION OF THE DRAWINGS

FIG. 4 includes a table outlining static decay and surface resistivity for housings of various data storage tape cartridges.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
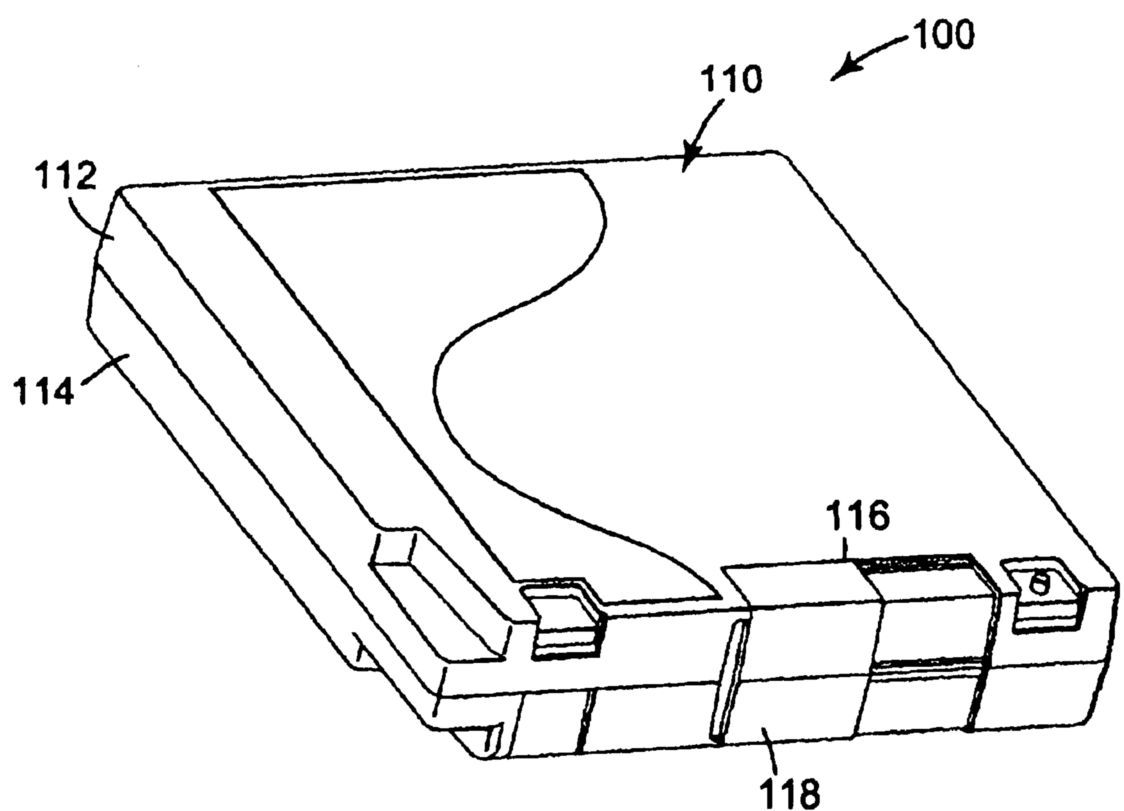
FIG. 1 is a perspective view of one embodiment of a data storage tape cartridge.
Figure 2:
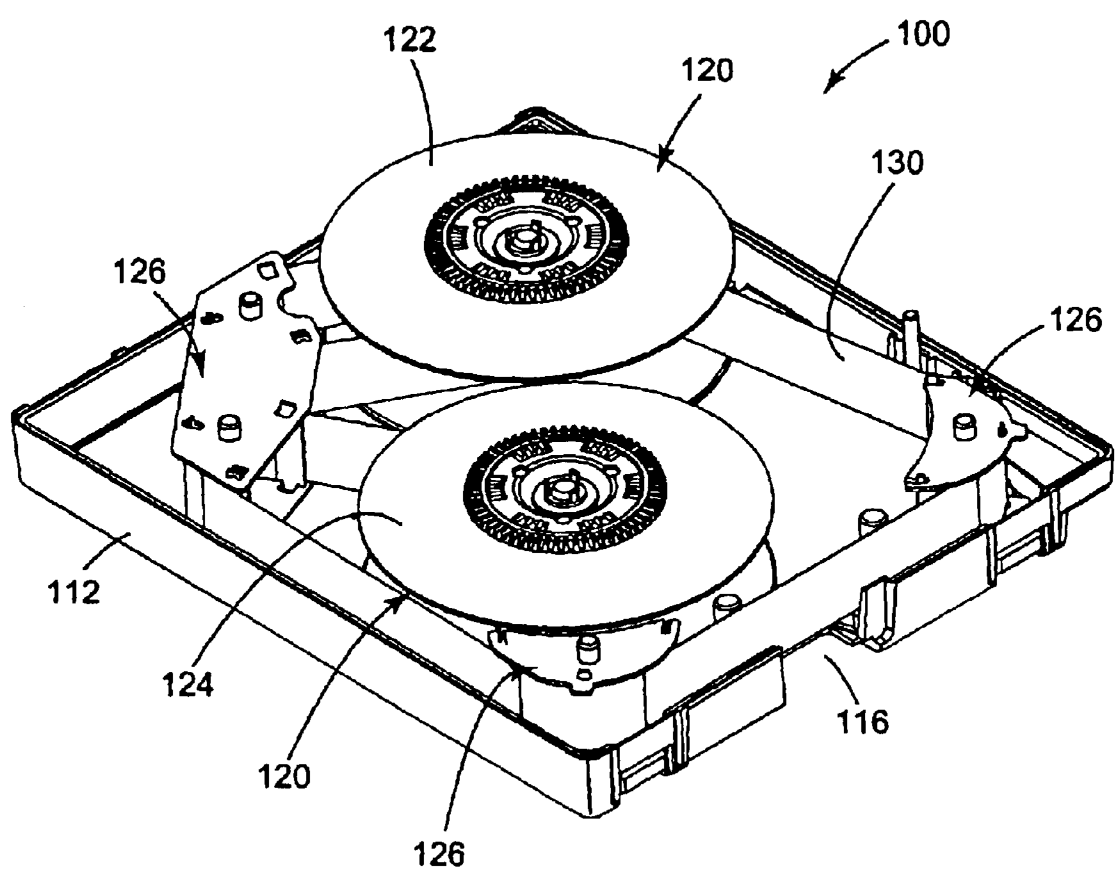
FIG. 2 is a perspective view of one embodiment of a data storage tape cartridge with a portion of the housing removed.
Figure 3:
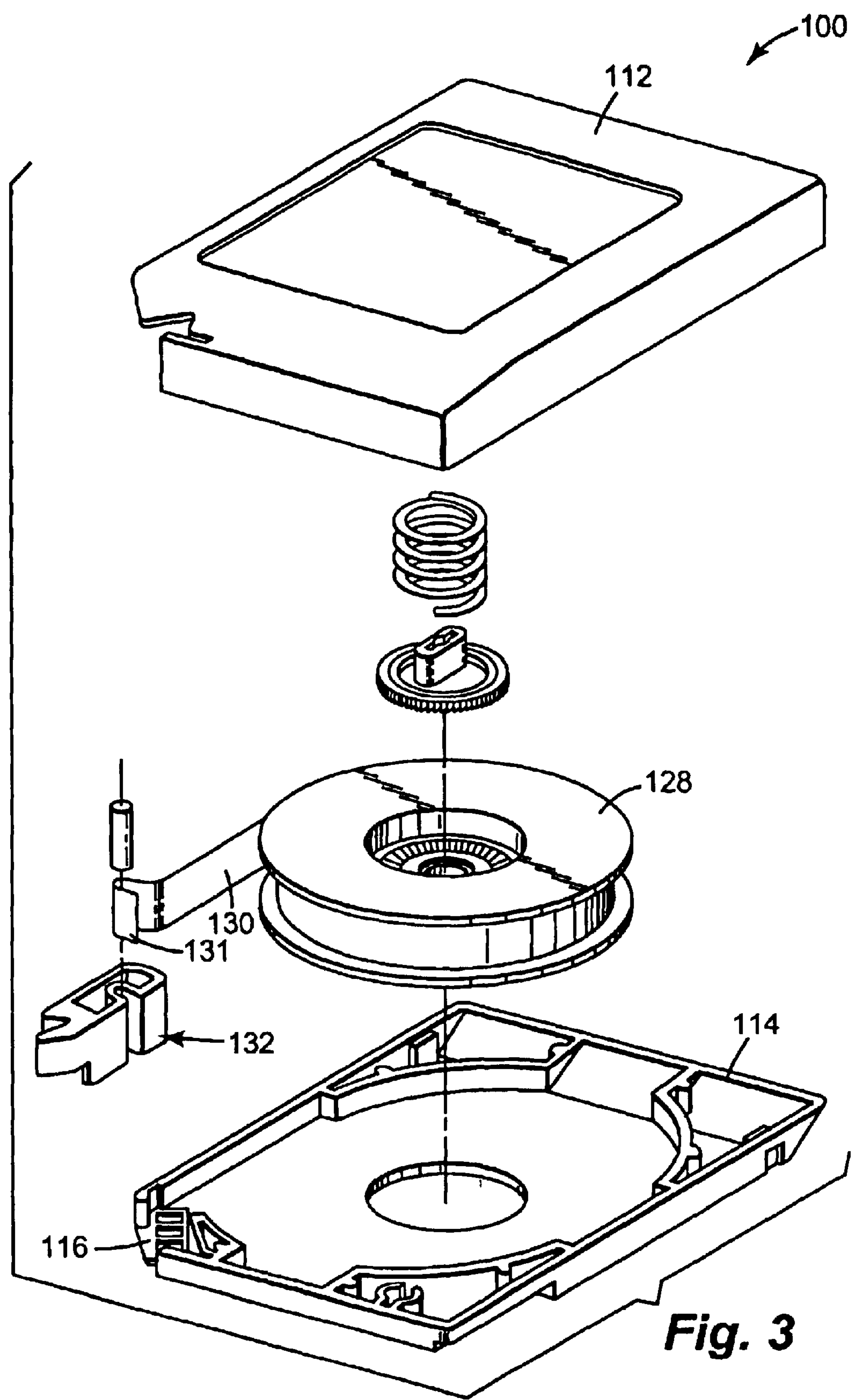
FIG. 3 is an exploded perspective view of another embodiment of a data storage tape cartridge.

FIGS. 1–3 illustrate one embodiment of a data storage tape cartridge 100. Data storage tape cartridge 100 includes a housing 110, one or more tape reels 120, and a length of magnetic storage tape 130. Tape reel 120 is rotatably disposed within housing 110 and magnetic storage tape 130 is wound around a portion of tape reel 120.

In one embodiment, housing 110 is formed by housing sections 112 and 114 each configured to be reciprocally mated to one another to form an enclosure or container for magnetic storage tape 130. As such, housing sections 112 and 114 combine to form a window 116 through which magnetic storage tape 130 can be accessed. In one embodiment, data storage tape cartridge 100 includes a door 118 slidably secured to housing 110 such that door 118 can be selectively moved to provide access to window 116.

Preferably, housing 110 is sized to be received by a standard tape drive (not shown). Housing 110 may be sized, for example, for use with a 5.25 inch (130 mm) form factor drive, a 3.5 inch (90 mm) form factor drive, or other size tape drive.

In one embodiment, as described in detail below, housing 110 is static dissipative. Thus, static charge generated in data storage tape cartridge 100 is dissipated so as to reduce the potential for damage to data on magnetic storage tape 130 and/or the tape drive system. For example, by dissipating static charge generated in data storage tape cartridge 100, the risk of imparting an electrical charge to the tape drive as the data storage tape cartridge is moved into and/or out of the tape drive is reduced.

In one embodiment, as illustrated in FIG. 2, data storage tape cartridge 100 includes a first tape reel 122, a second tape reel 124, and a plurality of guides 126. As such, tape reels 122 and 124, and guides 126 cooperate to define a tape path for magnetic storage tape 130 within housing 110. Magnetic storage tape 130 is fed, for example, from tape reel 122 and guided through housing 110 by guides 126 to tape reel 124. While magnetic storage tape 130 is guided through housing 110, magnetic storage tape 130 is guided along window 116 to permit interaction with magnetic storage tape 130 by a read/write head (not shown). It will be recognized by one of skill in the art that the illustrated tape path is but one of may available configurations. By incorporating different guides at various locations, the resulting tape path may be substantially different from that shown in FIG. 2.

In another embodiment, as illustrated in FIG. 3, data storage tape cartridge 100 includes a single tape reel 128. In addition, data storage tape cartridge 100 includes a leader block 132 to which a free end 131 of magnetic storage tape 130 is attached. As such, leader block 132 is engaged by a tape drive mechanism (not shown) such that magnetic storage tape 130 is fed from tape reel 128 through window 116 and directed along a tape path within the tape drive mechanism. Thus, the tape drive mechanism directs magnetic storage tape 130 into engagement with a read/write head (not shown).

In one embodiment, magnetic storage tape 130 includes a non-magnetic substrate (e.g., a film for magnetic recording tape applications) and a magnetic recording layer or film formed on one side of the non-magnetic substrate. The non-magnetic substrate includes, for example, a base material such as polyethylene naphthalate (PEN) or polyethylene terephthalate (PET) and the magnetic recording layer includes, for example, a layer of magnetic material dispersed within a suitable binder system. For example, the magnetic recording layer may include a magnetic metal particle powder or pigment dispersed in a polymeric binder.

In one embodiment, a backside coating is applied to the other side of the non-magnetic substrate of magnetic storage tape 130. The backside coating may include, for example, polyurethane, alumina, and carbon black. As such, the backside coating improves, for example, the durability, conductivity, and/or tracking characteristics of the media.

In one embodiment, magnetic storage tape 130 is MP2 storage tape or higher (e.g., MP2, MP3, MP4). As such, the magnetic metal particles (MP) of the magnetic recording layer of magnetic storage tape 130 have a length less than about 120 nanometers (nm). For example, MP2 particles have a length between about 120 nm and about 100 nm, MP3 particles have a length between about 100 nm and about 75 nm, and MP4 particles have a length between about 70 nm and about 50 nm.

In addition, in one embodiment, the magnetic recording layer of magnetic storage tape 130 has a coercivity of at least about 1800 Oersteds (Oe). Coercivity is defined as the intensity of the magnetic field needed to reduce the magnetization of a ferromagnetic material to zero after it has reached saturation. Thus, increased coercivity implies an increased magnetic saturation level of the media. Accordingly, with reduced magnetic metal particle size and increased coercivity, recording density of magnetic storage tape 130 can be increased.

In one embodiment, magnetic storage tape 130 has a width of approximately 0.5 inches or greater. More specifically, magnetic storage tape 130 may include, for example, ½ inch tape or ¾ inch tape. In addition, in one embodiment, data storage tape cartridge 100 includes at least approximately 850 feet of magnetic storage tape 130.

As described above, housing 110 is static dissipative. In one embodiment, for example, housing 110 has a surface resistivity in a range of approximately $10^6$ ohms/square to approximately $10^{12}$ ohms/square. Surface resistivity is a measurement of the resistance to flow of an electrical current over a surface. As a comparison, a surface resistivity greater than $10^{12}$ ohms/square is considered insulative and a surface resistivity in a range of $10^4$ ohms/square to $10^6$ ohms/square is considered conductive. As such, a material which is insulative will retain a static charge and a material which is conductive will discharge a static charge, often at an extremely high voltage.

With housing 110 being static dissipative, however, dissipation of a static charge, often measured as static decay, can be controlled. For example, in one embodiment, housing 110 dissipates approximately 5000 volts DC to approximately 500 volts DC in less than approximately 0.5 seconds. In one embodiment, measurement of the static dissipation of housing 110 is performed under the procedures of National Fire Protection Association (NFPA) Standard 99 in accordance with Method 4046 of Federal Test Method Standard 101C. Such procedures include conditioning and testing at 50+/−2 percent relative humidity and 23+/−1 degrees Celsius with a limit of 0.5 seconds to 10 percent decay for a charge applied to a 3 inch×5 inch×⅛ inch plaque of material.

In one embodiment, static dissipation of housing 110 is established by forming housing 110 of a thermal plastic material including a static dissipative polymer. More specifically, in one embodiment, housing 110 is formed of a material including at least one of polypropylene, polyethylene, polystyrene, nylon, polycarbonate, ABS, and acrylic, and a dissipative polymer. In one exemplary embodiment, housing 110 is formed of a material including polycarbonate, nylon, and a dissipative polymer. An example of such a material includes PermaStat® 399X-10739A available from RTP Company of Winona, Minn. In another exemplary embodiment, housing 110 is formed of a material including ABS resin and a dissipative polymer. An example of such a material includes Stat-Loy® A BK8-115 available from LNP Engineering Plastics Inc. of Exton, Pa.

In another embodiment, static dissipation of housing 110 is established by forming housing 110 of a carbon-filled resin. More specifically, in one embodiment, housing 110 is formed of a material including at least one of ABS, polystyrene, polycarbonate, polypropylene, and nylon, and a carbon fiber or carbon powder. In one exemplary embodiment, housing 110 is formed of a material including polycarbonate and carbon powder. An example of such a material includes Stat-Kon® D-EP V-1 available from LNP Engineering Plastics Inc. of Exton, Pa.

FIG. 4 includes a table outlining static decay and surface resistivity for housings of various data storage tape cartridges. In the table of FIG. 4, data storage tape cartridges C1 and C2 include comparative examples of data storage tape cartridges, and data storage tape cartridges EX3 and EX4 include examples of data storage tape cartridges formed according to the present invention. For each of the data storage tape cartridges C1, C2, EX3, and EX4, static decay and surface resistivity of the respective housings is identified. In one embodiment, static decay is measured under the procedures of NFPA Standard 99 in accordance with Method 4046 of Federal Test Method Standard 101C, as described above.

The data storage tape cartridge of comparative example C1 includes a housing formed of a material including polycarbonate, and the data storage cartridge of comparative example C2 includes a housing formed of a material including glass-filled polycarbonate. Static decay for comparative examples C1 and C2 is infinity in that the housings of comparative examples C1 and C2 do not dissipate an electrical charge. In addition, surface resistivity for comparative examples C1 and C2 is greater than $10^{12}$ ohms/square. As such, the housings of comparative examples C1 and C2 are both insulative and retain static charges.

The data storage tape cartridge of example EX3, however, includes a housing formed of a material including polycarbonate, nylon, and a dissipative polymer. The static decay of example EX3 is less than approximately 0.01 seconds and the surface resistivity is approximately $10^{10}$ ohms/square. Thus, the housing of example EX3 is static dissipative. In addition, the data storage tape cartridge of example EX4 includes a housing formed of a material including carbon-filled resin. The static decay of example EX4 is less than approximately 0.01 seconds and the surface resistivity is approximately $10^{9}$ ohms/square. Thus, the housing of example EX4 is also static dissipative. Accordingly, the data storage tape cartridges of examples EX3 and EX4 effectively dissipate static charges in a controlled manner.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A data storage tape cartridge, comprising:

a housing having a surface resistivity in a range of approximately $10^{6}$ ohms/square to approximately $10^{12}$ ohms/square;

at least one tape reel rotatably disposed within the housing; and a length of magnetic storage tape having a coercivity greater than approximately 1800 Oersteds wound around the at least one tape reel.

2. The data storage tape cartridge of claim 1, wherein the housing is adapted to dissipate approximately 5000 volts DC to approximately 500 volts DC in less than approximately 0.5 seconds.

3. The data storage tape cartridge of claim 1, wherein the housing includes a static dissipative polymer.

4. The data storage tape cartridge of claim 1, wherein the housing is formed of a material including at least one of polypropylene, polyethylene, polystyrene, nylon, polycarbonate, ABS, and acrylic, and a dissipative polymer.

5. The data storage tape cartridge of claim 1, wherein the housing is formed of a material including a carbon-filled resin.

6. The data storage tape cartridge of claim 1, wherein the magnetic storage tape has a width of at least approximately 0.5 inches and a length greater than approximately 850 feet.

7. The data storage tape cartridge of claim 1, wherein the magnetic storage tape includes a polyester film and a magnetic layer formed on the polyester film.

8. The data storage tape cartridge of claim 7, wherein the magnetic layer includes magnetic particles having a length less than about 120 nanometers.

9. The data storage tape cartridge of claim 1, wherein the at least one tape reel includes a single tape reel.

10. The data storage tape cartridge of claim 1, wherein the at least one tape reel includes a pair of tape reels.

11. A data storage tape cartridge, comprising:

a housing;

at least one tape reel rotatably disposed within the housing;

a length of magnetic storage tape having a coercivity greater than approximately 1800 Oersteds wound around the at least one tape reel; and means for dissipating a static charge in the data storage tape cartridge of approximately 5000 volts DC to approximately 500 volts DC in less than approximately 0.5 seconds.

12. The data storage tape cartridge of claim 11, wherein means for dissipating the static charge includes the housing having a surface resistivity in a range of approximately $10^{6}$ ohms/square to approximately $10^{12}$ ohms/square.

13. The data storage tape cartridge of claim 11, wherein means for dissipating the static charge includes the housing being formed of a static dissipative polymer.

14. The data storage tape cartridge of claim 11, wherein means for dissipating the static charge includes the housing being formed of a material including at least one of polypropylene, polyethylene, polystyrene, nylon, polycarbonate, ABS, and acrylic, and a dissipative polymer.

15. The dale storage tape cartridge of claim 11, wherein means for dissipating the static charge includes the housing being formed of a material including a carbon-filled resin.

16. The data storage tape cartridge of claim 11, wherein the magnetic storage tape has a width of at least approximately 0.5 inches and a length greater than approximately 850 feet.

17. The data storage tape cartridge of claim 11, wherein the magnetic storage tape includes a polyester film and a magnetic layer formed on the polyester film.

18. The data storage tape cartridge of claim 17, wherein the magnetic layer includes magnetic particles having a length less than about 120 nanometers.

19. The data storage tape cartridge of claim 11, wherein the at least one tape reel includes a single tape reel.

20. The data storage tape cartridge of claim 11, wherein the at least one tape reel includes a pair of tape reels.

21. A method of forming a data storage tape cartridge, the method comprising:

forming a housing with a surface resistivity in a range of approximately $10^{6}$ ohms/square to approximately $10^{12}$ ohms/square;

winding a length of magnetic storage tape having a coercivity greater than approximately 1800 Oersteds around at least one tape reel; and rotatably disposing the at least one tape reel within the housing.

22. The method of claim 21, wherein forming the housing includes forming the housing of a material adapted to dissipate approximately 5000 volts DC to approximately 500 volts DC in less than approximately 0.5 seconds.

23. The method of claim 21, wherein forming the housing includes forming the housing with a static dissipative polymer.

24. The method of claim 21, wherein forming the housing includes forming the housing of a material including at least one of polypropylene, polyethylene, polystyrene, nylon, polycarbonate, ABS, and acrylic, and a dissipative polymer.

25. The method of claim 21, wherein forming the housing includes forming the housing of a material including a carbon-filled resin.

26. The method of claim 21, wherein the magnetic storage tape has a width of at least approximately 0.5 inches and a length greater than approximately 850 feet.

27. The method of claim 21, wherein the magnetic storage tape includes a polyester film and a magnetic layer formed on the polyester film.

28. The method of claim 27, wherein the magnetic layer includes magnetic particles having a length less than about 120 nanometers.

29. The method of claim 21, wherein winding the length of magnetic storage tape includes winding the length of magnetic storage tape around a single tape reel.

30. The method of claim 21, wherein winding the length of magnetic storage tape includes winding the length of magnetic storage tape around a pair of tape reels.

31. A data storage tape cartridge, comprising:

a housing formed, of a material including a static dissipative polymer and having a surface resistivity in a range of approximately $10^6$ ohms/square to approximately $10^{12}$ ohms/square;

at least one tape reel rotatably disposed within the housing; and a length of magnetic storage tape wound around the at least one tape reel, wherein the magnetic storage tape has a coercivity greater than approximately 1800 Oersteds.

32. The data storage tape cartridge of claim 31, wherein the material of the housing further includes at least one of polypropylene, polyethylene, polystyrene, nylon, polycarbonate, ABS, and acrylic.

33. The data storage tape cartridge of claim 31, wherein the housing is adapted to dissipate approximately 5000 volts DC to approximately 500 volts DC in less than approximately 0.5 seconds.

34. The data storage tape cartridge of claim 31, wherein the magnetic storage tape has a width of at least approximately 0.5 inches and a length greater than approximately 850 feet.

35. The data storage tape cartridge of claim 31, wherein the magnetic storage tape includes a polyester film and a magnetic layer formed on the polyester film.

36. The data storage tape cartridge of claim 35, wherein the magnetic layer includes magnetic particles having a length less than about 120 nanometers.

37. The data storage tape cartridge of claim 31, wherein the at least one tape reel includes a single tape reel.

38. The data storage tape cartridge of claim 31, wherein the at least one tape reel includes a pair of tape reels.

* * * * *